(12) United States Patent
Ries (10) Patent No.: US 11,122,932 B2
(45) Date of Patent: Sep. 21, 2021

(54) BARBECUE LID HOLDER

(71) Applicant: Gary Ries, Las Vegas, NV (US)

(72) Inventor: Gary Ries, Las Vegas, NV (US)

( * ) Notice: Subject to any disclaimer, the term of this patent is extended or adjusted under 35 U.S.C. 154(b) by 118 days.

(21) Appl. No.: 16/277,240

(22) Filed: Feb. 15, 2019

(65) Prior Publication Data

US 2019/0254478 A1 Aug. 22, 2019

Related U.S. Application Data

(60) Provisional application No. 62/710,279, filed on Feb. 16, 2018.

(51) Int. Cl.
*A47J 37/07* (2006.01)

(52) U.S. Cl.
CPC ....... *A47J 37/0786* (2013.01); *A47J 37/0704* (2013.01)

(58) Field of Classification Search
CPC ............... A47J 37/0786; Y10T 16/544; Y10T 16/5448; Y10T 403/32581; E05D 3/18; E05D 15/30
USPC ................ 126/25 R; 16/348, 357, 360, 361
See application file for complete search history.

(56) References Cited

U.S. PATENT DOCUMENTS

| 3,274,987 | A | * | 9/1966 | Hastings, Jr. | .......... A47J 37/06 126/25 R |
| 4,192,283 | A | | 3/1980 | Kridler et al. | |
| 4,584,984 | A | * | 4/1986 | Croft | ................... A47J 37/0786 126/25 R |
| 4,759,338 | A | | 7/1988 | Croft | |
| 4,895,130 | A | * | 1/1990 | Staschke | ................. A47J 36/12 126/25 A |
| 5,213,299 | A | | 5/1993 | Henry | |
| 5,228,737 | A | * | 7/1993 | Zimmerman | .......... B62D 25/12 217/61 |
| 5,421,318 | A | * | 6/1995 | Unruh | ................... A47J 37/042 126/25 A |
| 5,829,426 | A | * | 11/1998 | Cloutier | .............. A47J 37/0704 126/41 R |
| 6,176,232 | B1 | | 1/2001 | Corcoran | |
| 6,357,435 | B1 | | 3/2002 | Van Hook | |

(Continued)

OTHER PUBLICATIONS

Rockler; 'Friction Lid Supports—Curved'; https://www.rockler.com/friction-lid-supports-curved; 2015 (Year: 2015).*

(Continued)

*Primary Examiner* — Joshua T Kennedy
(74) *Attorney, Agent, or Firm* — The Thornton Firm, LLC (57) ABSTRACT

A barbecue lid holder includes a slide rail with a top end, a bottom end, and a hollow slot extending from the top end to the bottom end; an adjustable fastener attachable to the top end of the slide rail; and a shaped support base with an adjustable fastener hingedly attached to the bottom end of the slide rail. Use of the barbecue lid holder involves the steps of securing the support base in a location where the support base may remain in place, adjusting the height and angle of the barbecue grill lid to the desired position, and securing the barbecue grill lid in place by securing the adjustable fastener attachable to the top end of the barbecue by hand tightening the hand tightenable nut and bolt assembly when the desired height for the barbecue lid is achieved.

11 Claims, 7 Drawing Sheets

(56) References Cited

U.S. PATENT DOCUMENTS

| | | | | |
|---|---|---|---|---|
| 6,705,306 B1* | 3/2004 | Dickey | ............... | A47J 37/0786 |
| | | | | 126/25 R |
| 2004/0094141 A1* | 5/2004 | Herring | .................. | A47J 36/12 |
| | | | | 126/25 R |
| 2007/0006866 A1* | 1/2007 | O'Niell | .................. | F24C 15/12 |
| | | | | 126/25 R |
| 2015/0366403 A1* | 12/2015 | Blumenthal | ........ | A47J 37/0786 |
| | | | | 30/142 |

OTHER PUBLICATIONS

D. Lawless Hardware; 'Friction Lid Support Brass 6.75" L-A510AL-BP-A'; https://www.dlawlesshardware.com/frlidsubr6l.html; 2017 (Year: 2017).*

Hinge Outlet; 'Lid Support—Curved Locking Stays'; https://www.hingeoutlet.com/collections/lid-support-hinges/products/copy-of-lid-door-stay-with-nylon-slider-8-1-2-long-sold-individually; 2019 (Year: 2019).*

Ragland Piano; 'Piano Bench Lid Support Hinge w/Screws & Instructions—Prop Open Top'; https://www.amazon.com/Piano-Bench-Support-Screws-Instructions/dp/B07XVPGXGX; 2019 (Year: 2019).*

* cited by examiner

BARBECUE LID HOLDER

CROSS-REFERENCE TO RELATED APPLICATIONS

The present utility patent application claims priority benefit of the U.S. Provisional Application for Patent Ser. No. 62/710,279 titled "BBQ Lid Holder," filed on Feb. 16, 2018 under 35 U.S.C. 119(e). The contents of this related provisional application are incorporated herein by reference for all purposes to the extent that such subject matter is not inconsistent herewith or limiting hereof.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

BACKGROUND OF THE INVENTION

1. Field of the Invention

One or more embodiments of the invention generally relate to barbecue grill accessories. More particularly, embodiments of the invention relate to a lid holder implementable to barbecue grill lids.

2. Description of the Related Art

Barbecue grills are well known in the art. A barbecue grill is a device that cooks food by applying heat from below. Modern barbecue grills generally have a flame source or burner, a cooking grate or grill, and a lid. Though there are several varieties of barbecue grills, most modern grills fall within two categories—gas-fueled or charcoal. Most modern barbecues also have surfaces located to the side of the grill for the preparation of food or as a resting place for food and utensils.

Modern households love to grill and barbecue. Put simply, barbecuing brings people together. Studies have revealed that over 80 percent of United States households own at least one outdoor grill, with over 40 percent have more than one.

Because of the popularity of barbecues and barbecue grills, people are continuously attempting to prepare better and more diverse meals on barbecue grills. Over time, people have discovered that certain foods cook differently depending on whether a barbecue lid remains open or closed. For example, keeping a lid in a closed position may provide for more smoke which may add different flavors to the food being cooked. A closed lid may also provide a convection effect as heat will circulate in a closed environment instead of simply dissipating into the environment. Alternatively, an open lid may provide completely different effects. In charcoal or woodburning grills, the cooking temperature may be governed by adjusting the airflow through the grill by opening and closing the lid.

Many barbecue grills sold today come with lids that attach to barbecue grills by a plurality of hinges and tend to open to a resting position at a ninety-degree angle. A number of other grills sold today have a removable lid. In these two popular varieties, though, there are two positions a barbecue grill may assume—open and closed.

Because adjusting the position of a barbecue grill's lid may produce differing results for different foods, there is currently a need for device that a barbecue user may attach to a conventional barbecue grill that keeps a barbecue grill lid propped open at a desired angle.

SUMMARY

The present invention answers the need for device that a barbecue user may attach to a conventional barbecue grill that keeps a barbecue grill lid propped open at a desired angle. The invention is directed to a barbecue lid holder comprising a slide rail with a top end, a bottom end, and a hollow slot extending from the said top end to the said bottom end; an adjustable fastener attachable to the top end of the said slide rail; and a shaped support base with a fastening means hingedly attached to the said bottom end of the said slide rail. Use of the barbecue lid holder involves the steps of securing the support base in a location where the said support base may remain in place; securing the top end of the barbecue grill lid by threading a bolt mounted to and extending from the barbecue lid through the hollow slot of the barbecue lid holder to a hand tightening nut threadedly attachable to the said bolt; adjusting the height of the barbecue grill lid to the desired position while allowing the said bolt to slide along the said slot of the barbecue lid holder; and tightening the hand tightening nut on the top end of the barbecue when the desired height for the barbecue lid is achieved.

This innovative product is designed to keep a barbecue lid propped open, and at the precise angle desired. The present invention is adjustable and can be easily mounted to the lid of a standard barbecue grill. The support base may attach magnetically to the grill's tray or it may attach by a hook and eye fastener means for recessed island grills. The base is specially designed to ensure that a barbecue grill lid may be closed without interfering with the barbecue lid cover.

BRIEF DESCRIPTION OF THE DRAWINGS

The invention directed by way of example, and not by way of limitation, in the figures of the accompanying drawings and in which like reference numerals refer to similar elements and in which.

Unless otherwise indicated illustrations in the figures are not necessarily drawn to scale.

DETAILED DESCRIPTION OF THE PREFERRED EMBODIMENTS

Terminology used herein is used for the purpose of describing particular embodiments only, and is not intended to limit the scope of the present invention. It must be understood that as used herein and in the appended claims, the singular forms "a," "an," and "the" include the plural reference unless the context clearly dictates otherwise. For example, a reference to "an element" is a reference to one or more elements and includes all equivalents known to those skilled in the art. All conjunctions used are to be understood in the broadest context possible. As such, the word "or" should be understood as having the definition of a logical "or" rather than that of a logical "exclusive or" unless the context clearly necessitates otherwise. Language that may be construed to express approximation should be so understood unless the context clearly dictates otherwise.

Unless defined otherwise, all technical and scientific terms used herein have the same meanings as commonly understood by a person of ordinary skill in the art to which this invention belongs. Preferred methods, techniques, devices, and materials are described. But any methods, techniques, devices, or materials similar or equivalent to those described herein may be used in the practice or testing of the present invention. Structures described herein should also be understood to refer to functional equivalents of such structures.

References to "one embodiment," "an embodiment," "various embodiments," etc., may indicate that the embodiment(s) of the invention so described may include particular features, structures, or characteristics. However, not every embodiment necessarily includes the particular features, structures, or characteristics. Further, repeated use of the phrase "in one embodiment," or "in an exemplary embodiment," do not necessarily refer to the same embodiment although they may. A description of an embodiment with several components in communication with each other does not imply that all such components are required. On the contrary, a variety of optional components are described to illustrate the wide variety of possible embodiments of the present invention.

As is well known to those skilled in the art, many careful considerations and compromises typically must be made when designing for the optimal manufacture of a commercial implementation of such a barbecue lid holder. A commercial implementation in accordance with the spirit and teachings of the invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art.

The exemplary barbecue lid holder will now be described in detail with reference to embodiments thereof as illustrated in the accompanying drawings.

Figure 1:
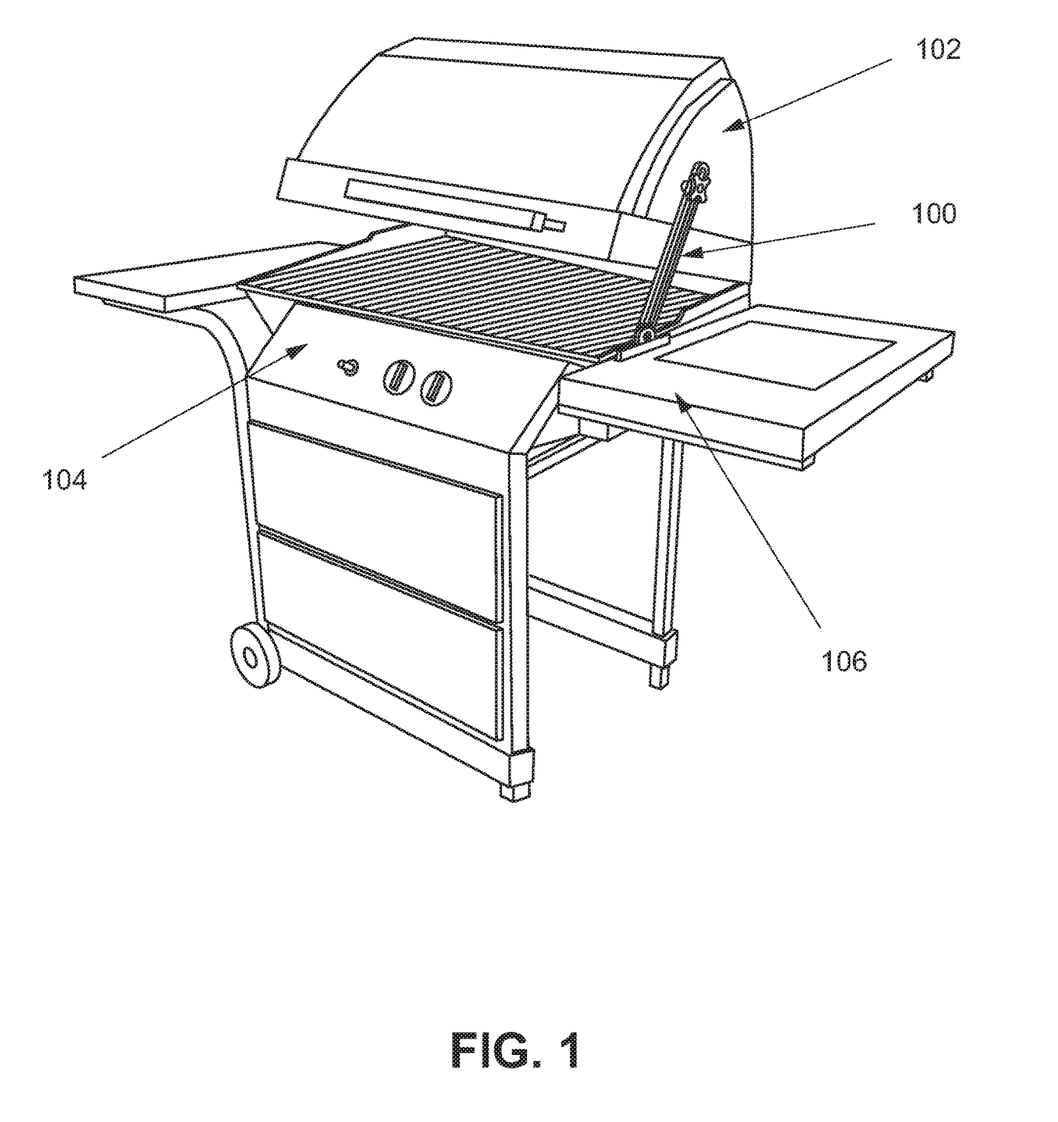
FIG. 1 is a perspective view of the left side of a barbecue lid using the barbecue lid holder in accordance with an embodiment of the invention.

FIG. 1 is a perspective view of the left side of a barbecue lid using the barbecue lid holder in accordance with an embodiment of the invention. In this view, a barbecue lid 102 is hingedly attached to a barbecue grill 104 and is being held partially open by the barbecue lid holder 100. One end of the barbecue lid holder 100 may attach to a barbecue lid 102 while the other end of the barbecue lid holder 100 may rest on the table extension 106 of a standard barbecue grill to hold a barbecue lid open in a position selected by a user.

Figure 2:
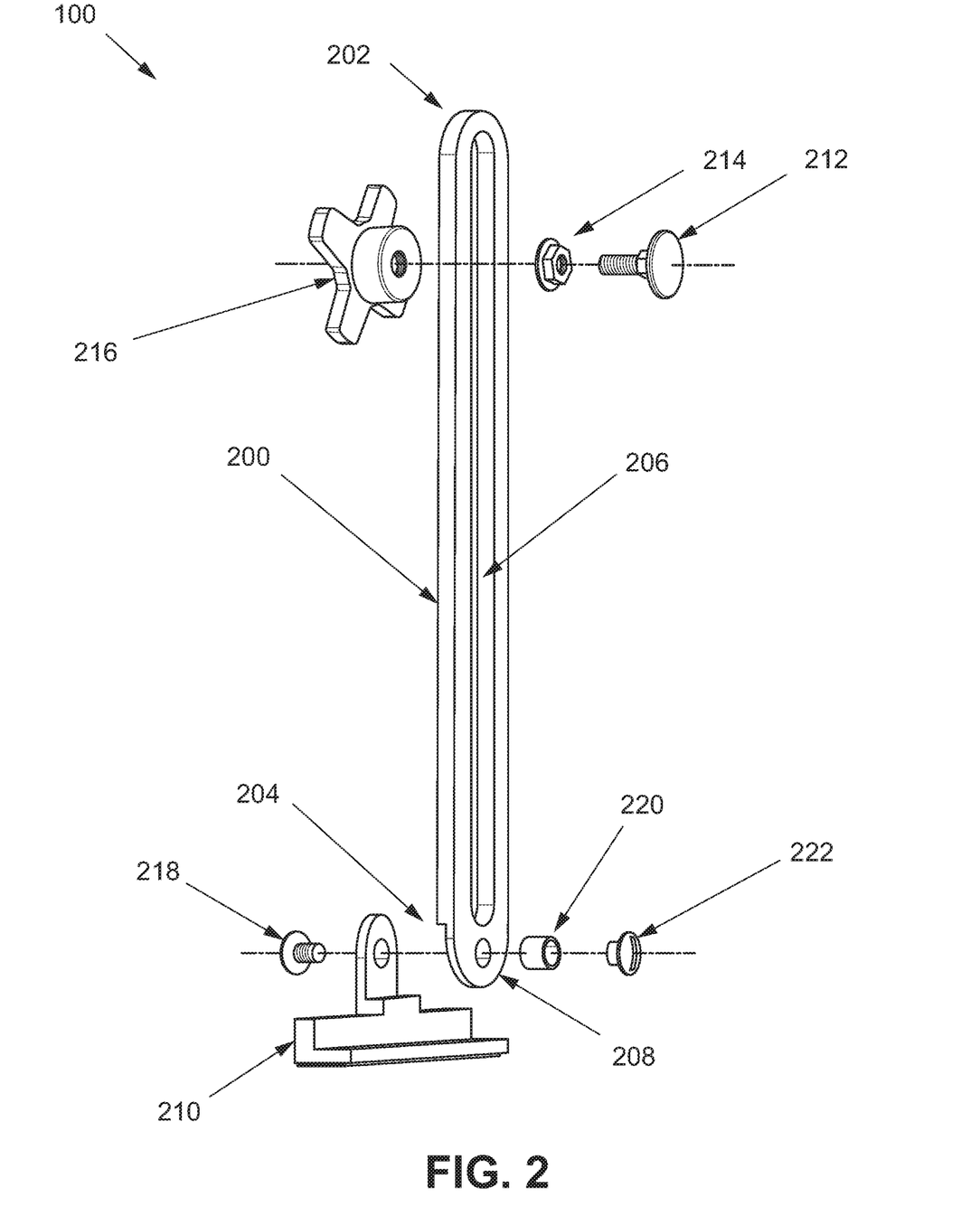
FIG. 2 is an exploded view of the barbecue lid holder in accordance with an embodiment of the invention.

FIG. 2 is an exploded view of the barbecue lid holder 100 in accordance with an embodiment of the invention. The barbecue lid holder 100 comprises a slide rail 200 with a top end 202 and a bottom end 204. The slide rail 200 may have a guide slot 206 in the center of the rail extending from the top end 202 to the bottom end 204 so as to form a generally obround or stadium shape. The bottom end 204 may be shaped differently than the top end 202 to form a rounded tab 208 which may hingedly attach to a support base 210. Persons skilled in the art will appreciate that the support base 210 may attach to the bottom end 204 of the slide rail 200 by various means such as, but not limited to, a screw 218 post 220 and cap 222 means. The support base may be configured to freely pivot about the attachment point to the bottom end 204.

The top end 202 may attach to the lid of a barbecue grill by a fastening means 212 which may fit through the guide slot 206 and attach to a hand tightenable fitting 216. A flanged nut or corrugated nut 214 may be used to tighten fastening means 212 to a barbecue lid and to keep the barbecue lid holder in better alignment with the barbecue lid. Persons skilled in the art will readily appreciate that the fastening means 212 and tightenable fitting 216 may be, but is not limited to, a bolt and hand-tightenable star knob and bolt assembly.

In one embodiment of the invention, the slide rail 200 may be made from a heat-resistant thermoplastic material such as polycarbonates. Persons skilled in the art will readily appreciate that the slide rail may be made from other heat-tolerant materials such as, but not limited to, metal and metal alloys and/or other heat-tolerant plastics. Persons skilled in the art will also understand that the slide rail 200 may be shaped by numerous means known and understood in the art such as, but not limited to, casting, injection molding, 3D printing, milling or machining.

Figure 3:
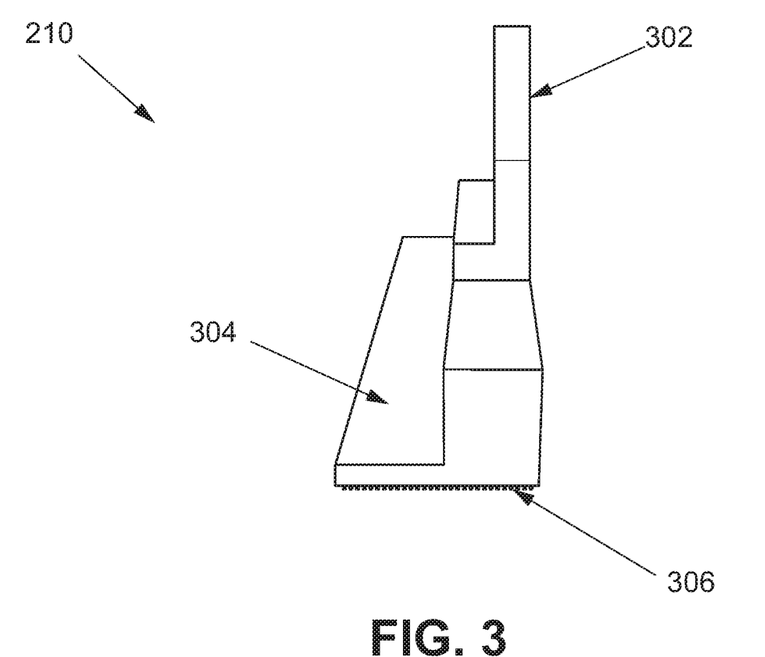
FIG. 3 is a front perspective view of the support base of the barbecue lid holder in accordance with an embodiment of the invention.

FIG. 3 is a front perspective view of the support base of the barbecue lid holder in accordance with an embodiment of the invention. The support base 210 is comprised of a rounded tab 302, a footer 304, and a fastening means 306. The support base 210 may assume different shapes and conformations. In some embodiments of the invention, the support base 210 may include a footer 304 which may serve as a spacer between a barbecue lid and the side table when closed. Because some barbecue lids have a near tight fit, the support base 210 may be reversed with the footer 304 facing away from the grill for such a fit. The general design is for the footer to have a wider base for added stability. In certain barbecue grills, there may exist a footer on the lid that acts as a spacer between the lid and the table when closed. In this view the fastening means 306 may be a hook and eye fastening system known commonly by the trade name Velcro®. The fastening means 306 may be affixed to the bottom of the support base 210 through the use of adhesives known and understood by persons having skill in the art.

Persons skilled in the art will readily appreciate that the support base may be shaped in multiple ways so as to interact with a barbecue lid, and that the support base 210 may be made from other heat-tolerant materials such as, but not limited to, metal and metal alloys and/or other heat-tolerant plastics. Persons skilled in the art will also appreciate that the support base 210 may be shaped by numerous means known and understood in the art such as, but not limited to, casting, injection molding, 3D printing, milling or machining.

Figure 4:
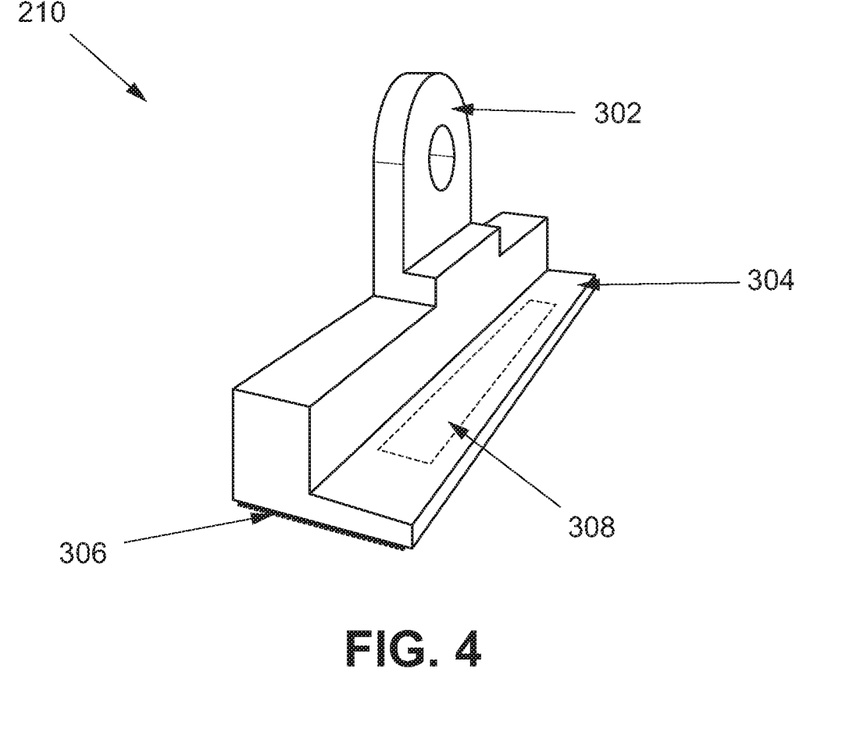
FIG. 4 is a side perspective view of the support base of the barbecue lid holder in accordance with an embodiment of the invention.

FIG. 4 is a side perspective view of the support base of the barbecue lid holder in accordance with an embodiment of the invention. The support base 210 is comprised of a rounded tab 302 and a footer 304, and a fastening means 306. In this view, one or more magnets represented by dashed lines embedded into the footer 304. Persons skilled in the art will readily appreciate that there are numerous means to embed a magnet into the base known and understood in the art. Furthermore, persons skilled in the art will readily appreciate that one or more magnets may be positioned in various configurations to improve the attachability to a barbecue grill or barbecue grill table extension. The magnet or magnets may be of various shapes and sizes and may magnetically attach to a table extension of a standard barbecue grill. In this view the fastening means may be a hook and eye fastening system known commonly by the trade name Velcro®. The fastening means 306 may be affixed to the bottom of the base 304 through the use of adhesives known and understood by persons having skill in the art.

Figure 5:
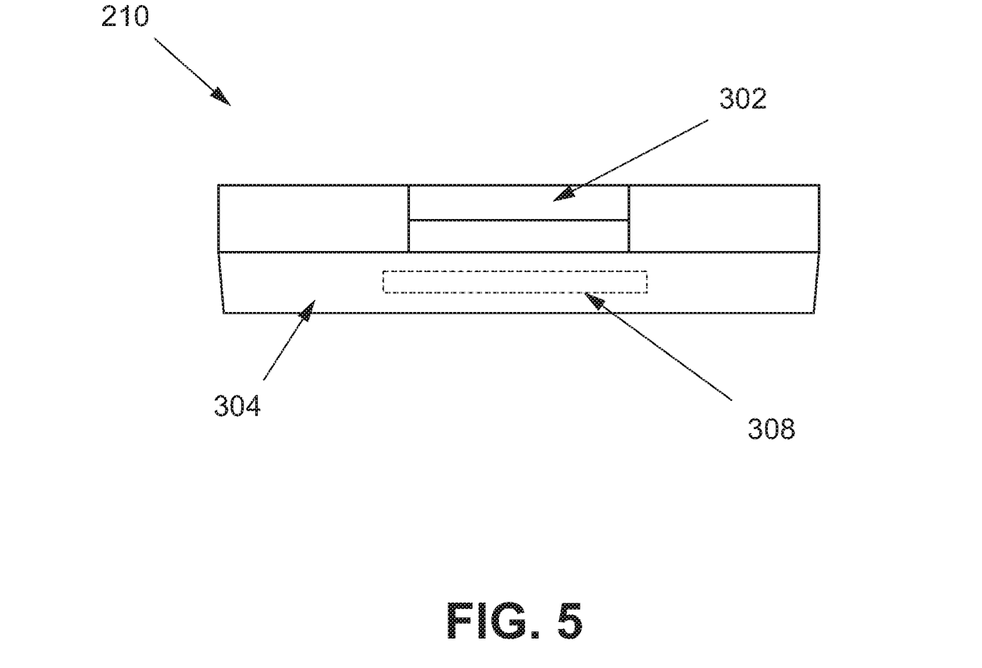
FIG. 5 is a top view of the support base of the barbecue lid holder in accordance with an embodiment of the invention.

FIG. 5 is a top view of the support base of the barbecue lid holder in accordance with an embodiment of the invention. The support base is comprised of a rounded tab 302 and a fastening means 306. In this view, one or more magnets 308 represented by dashed lines embedded into the footer 304. Persons skilled in the art will readily appreciate that there are numerous means to embed one or more magnets into the support base 210 or footer 304 known and understood in the art. Magnets 308 may be of various shapes and sizes and may magnetically attach to a table extension of a standard barbecue grill.

Figure 6:
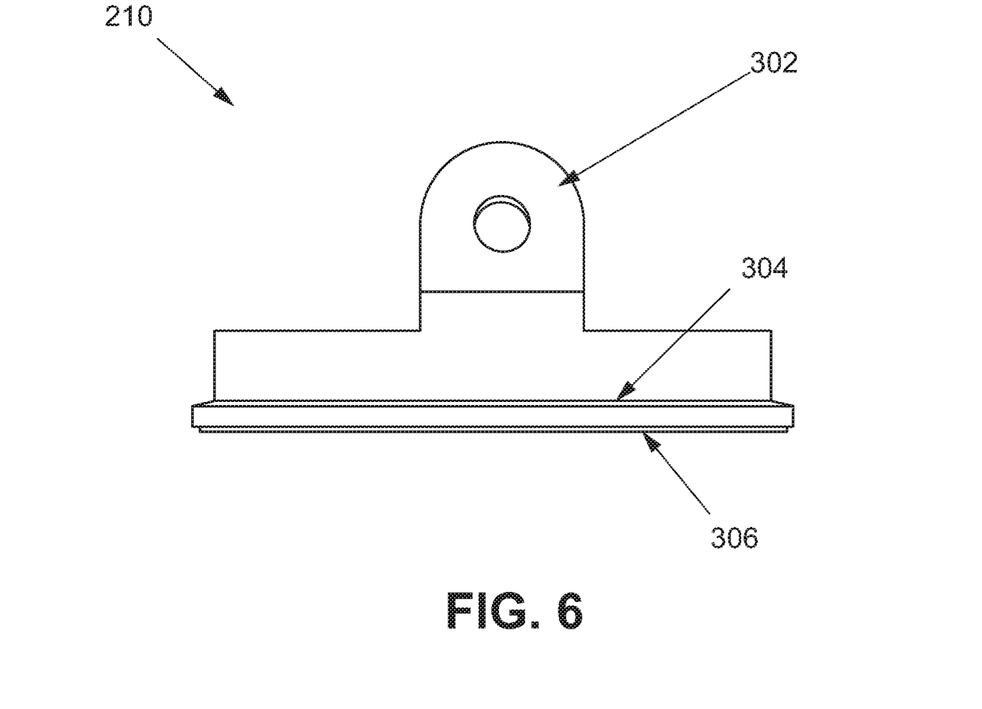
FIG. 6 is a side view of the support base of the barbecue lid holder in accordance with an embodiment of the invention.

FIG. 6 is a side view of the support base of the barbecue lid holder in accordance with an embodiment of the invention. In this view, the rounded tab 302 configured in such a way so as to hingedly attach to the slide rail 200. In one embodiment of the invention, the support base 210 may be made from a heat-resistant thermoplastic material such as polycarbonates. Persons skilled in the art will readily appreciate that the support base 210 may be made from other heat-tolerant materials such as, but not limited to, metal and metal alloys and/or other heat-tolerant plastics. Persons skilled in the art will also understand that the slide rail 210 may be shaped by numerous means known and understood in the art such as, but not limited to, injection molding, 3D printing, milling or machining.

Figure 7:
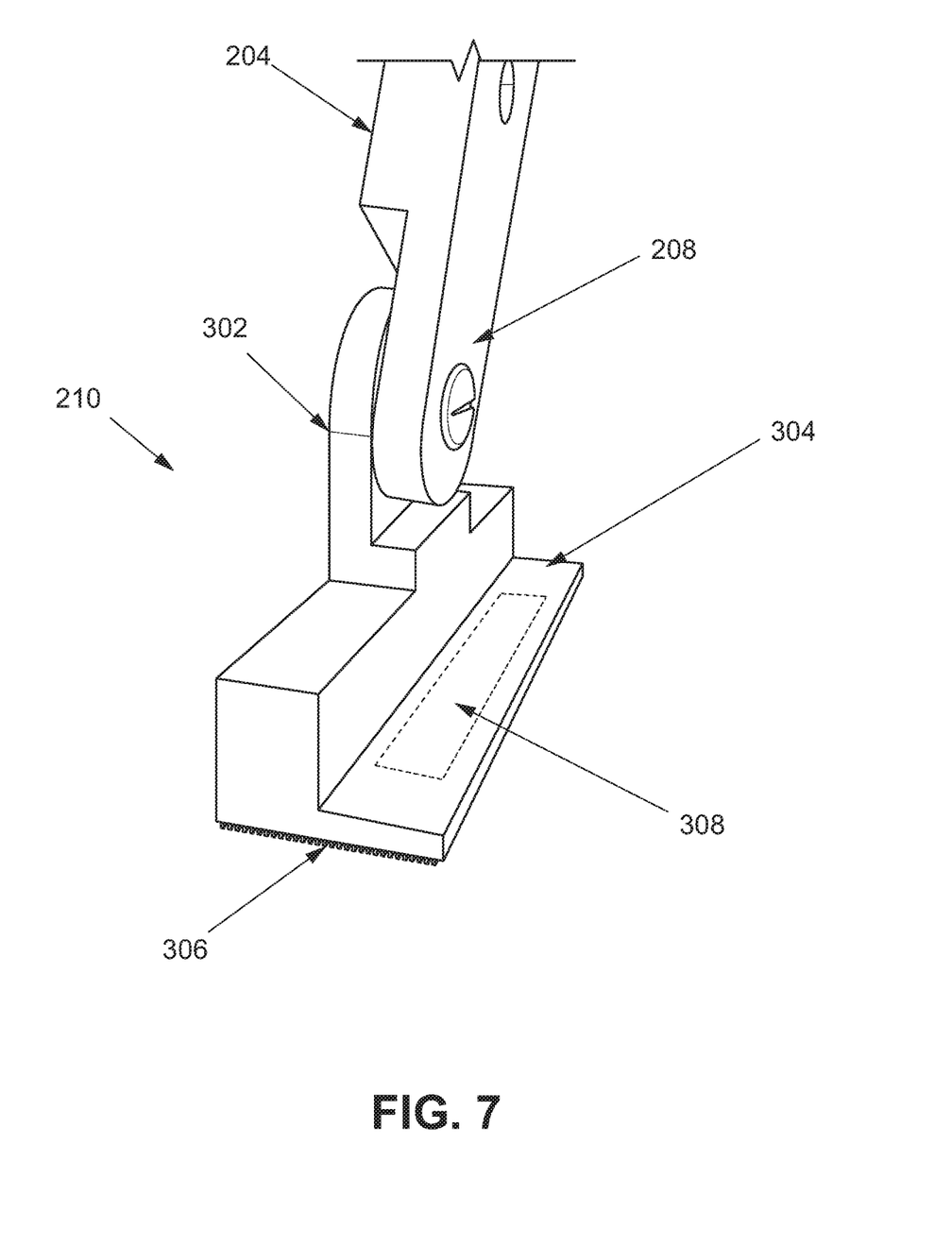
FIG. 7 is a perspective view of the support base of the barbecue lid holder in accordance with an embodiment of the invention.

FIG. 7 is a perspective view of the support base of the barbecue lid holder in accordance with an embodiment of the invention. The support base is comprised of a rounded tab 302, a footer 304, and a fastening means 306. In this view, one or more magnets represented by dashed lines embedded into the footer 304. Persons skilled in the art will readily appreciate that there are numerous means to embed a magnet into the base known and understood in the art. Magnets may be of various shapes and sizes and may magnetically attach to a table extension of a standard barbecue grill. In this view the fastening means may be a hook and eye fastening system known commonly by the trade name Velcro®. The fastening means 306 may be affixed to the bottom of the base 304 through the use of adhesives known and understood by persons having skill in the art. In this view, one or more magnets represented by dashed lines is embedded into the footer 304. Persons skilled in the art will readily appreciate that there are numerous means to embed a magnet into the support base 210 or footer 304 known and understood in the art. Magnets may be of various shapes and sizes and may magnetically attach to a table extension of a standard barbecue grill.

Figure 8:
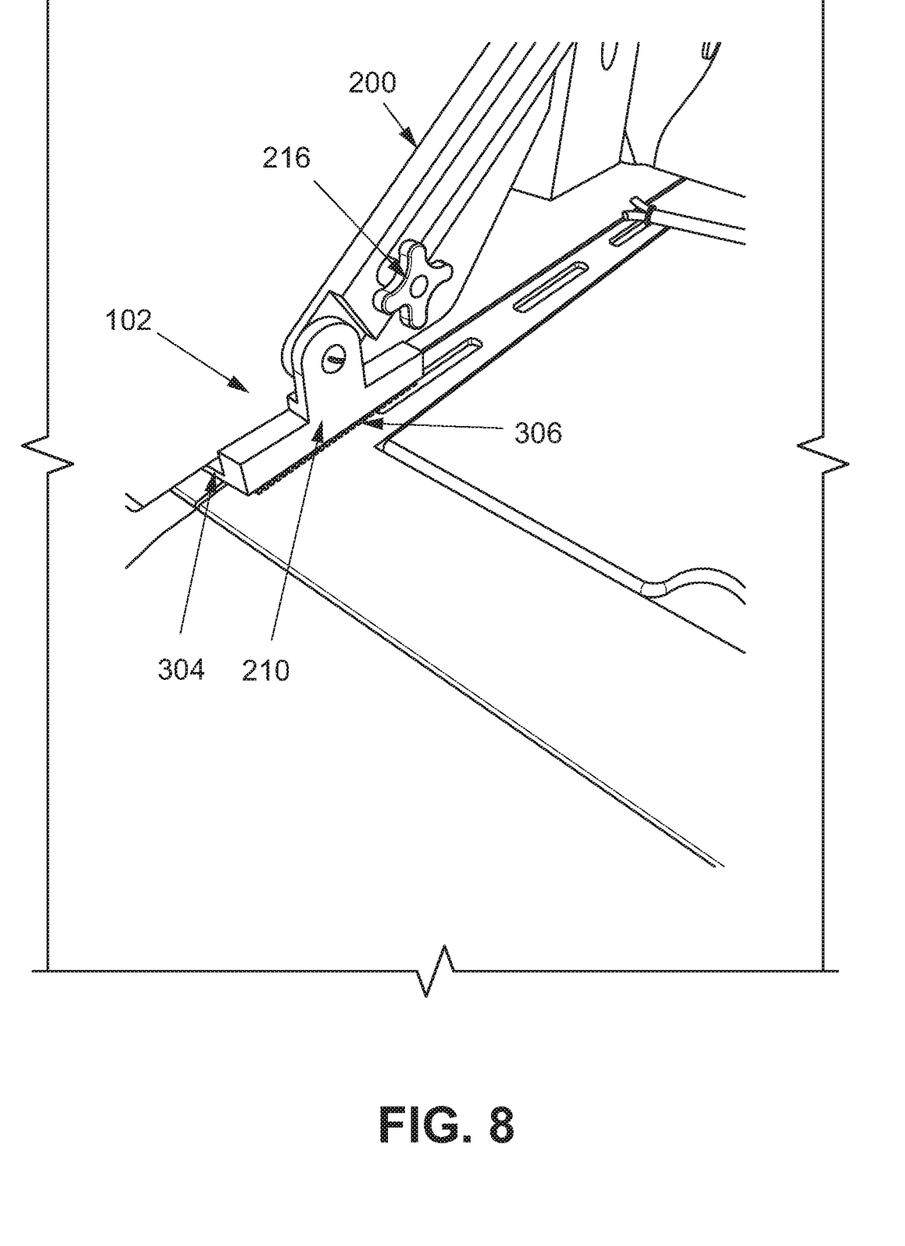
FIG. 8 is a perspective detail view of the barbecue lid holder support base of the barbecue lid holder in accordance with an embodiment of the invention.

FIG. 8 is a perspective detail view of the barbecue lid holder support base of the barbecue lid holder in accordance with an embodiment of the invention. To shut a barbecue lid 102 employing the exemplary barbecue lid holder, a user simply loosens the hand tightenable fitting 216 closes the lid 102. In this view, the barbecue lid 102 is closed and the footer 304 rests beneath a segment of the lid. In alternative embodiments of the invention, the support base 210 may be reversed with the footer 304 facing outward to allow certain barbecue lids to shut completely. The fastening means 306 is also shown in this image. Persons skilled in the art will readily appreciate that the support base 210 may be held in place by the fastening means 306 or through the use of one or more magnets embedded in the support base 210 and footer 304.

Figure 9:
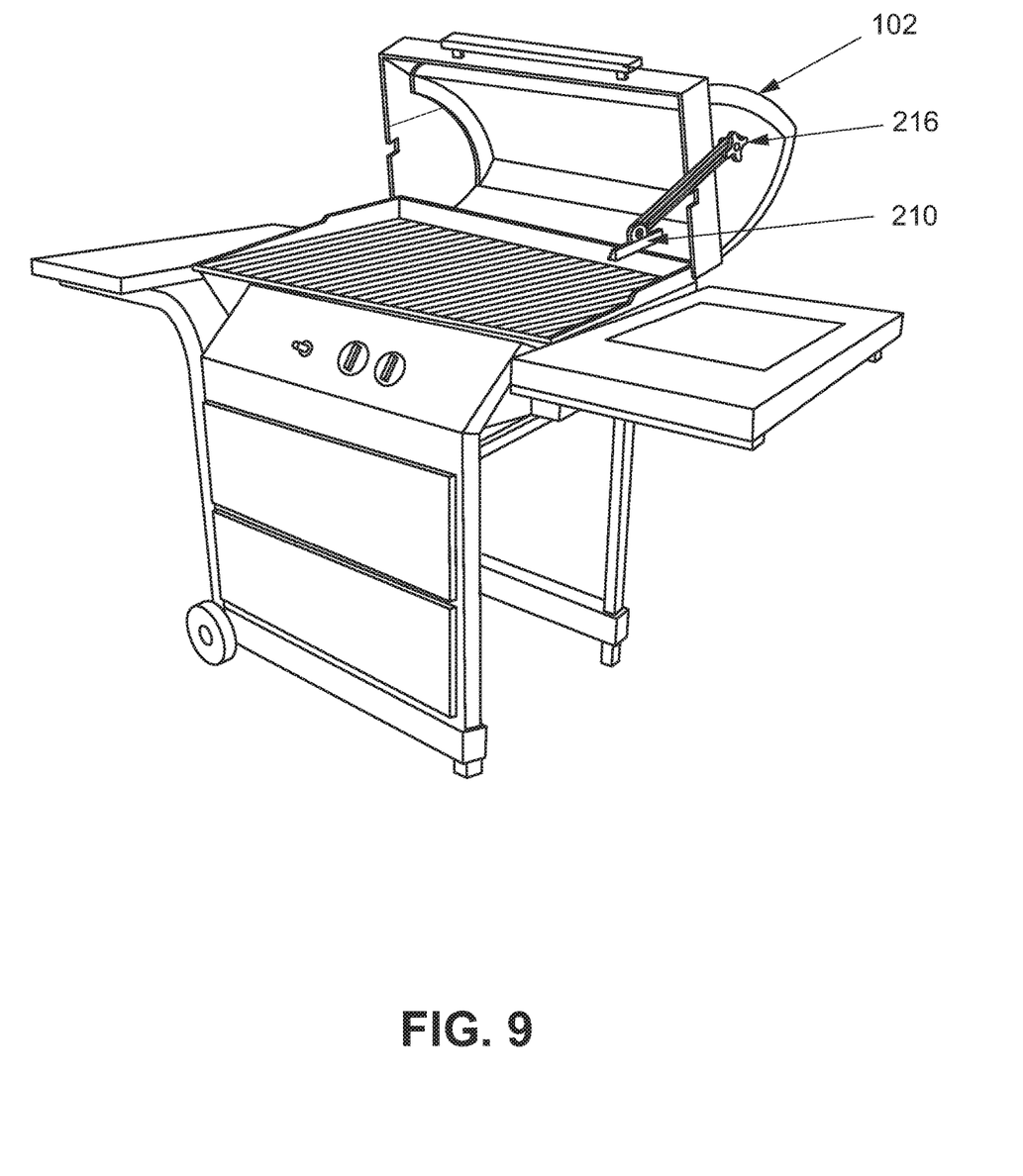
FIG. 9 is a perspective view of the barbecue lid holder in relation to a barbecue grill in accordance with an embodiment of the invention.

FIG. 9 is a perspective view of the barbecue lid holder in relation to a barbecue grill in accordance with an embodiment of the invention. In this view, the lid 102 is open at an angle of roughly ninety degrees. In an embodiment of the invention, with the barbecue lid completely open, the support base 210 may swing freely so as to conform with whatever angle the user ultimately chooses.

In various embodiments of the invention, use of the exemplary barbecue lid holder involves the general steps of securing the support base 210 in a location where the said support base 210 may remain in place, securing the top end of the barbecue grill lid by threading a bolt mounted to and extending from the barbecue lid through the hollow slot of the barbecue lid holder to a hand tightening nut 216 threadedly attachable to the said bolt, adjusting the height of the barbecue grill lid to the desired position while allowing the said bolt to slide along the said slot of the barbecue lid holder; and tightening the hand tightening nut 216 on the top end of the barbecue when the desired height for the barbecue lid is achieved. Persons skilled in the art will understand that other ways of using and adjusting the barbecue lid holder are available.

Having fully described at least one embodiment of the exemplary barbecue lid holder, other equivalent or alternative methods of implementing the barbecue lid holder according to the present invention will be apparent to those skilled in the art. Various aspects of the invention have been described above by way of illustration, and the specific embodiments disclosed are not intended to limit the invention to the particular forms disclosed. The particular implementation of the barbecue lid holder may vary depending upon the particular context or application. Persons having skill in the art will readily appreciate the aforementioned components may be configured to one another by various means and may not necessarily be drawn to scale. Furthermore, based on the provided drawings, persons having skill in the art will understand how to make and use the present invention without undue experimentation.

By way of example, and not limitation, barbecue lid holder described in the foregoing patent application is principally directed towards a standard barbecue grill. However, similar techniques may instead be applied to fire pits and commercial grills, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Although specific features of the invention are shown in some drawings and not others, persons skilled in the art will understand that this is for convenience and ease of understanding. Each feature may be combined with any or all of the other features in accordance with the invention. The words "including," "comprising," "having," and "with" as used herein are to be interpreted broadly and comprehensively and are not limited to any physical interconnection. Any such numbering and lettering in itself is not intended to and should not be taken to indicate the ordering of elements and/or steps in the claims to be added at a later date.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Any amendment presented during the prosecution of the application for this patent is not a disclaimer of any claim element presented in the description or claims to be filed. Persons skilled in the art cannot reasonably be expected to draft a claim that would literally encompass each and every equivalent.

What is claimed is:

1. A barbecue lid holder comprising:
   a slide rail having a top end, a bottom end, and a hollow slot extending from said top end to said bottom end;
   an adjustable fastener slidably attached within said hollow slot of said slide rail, where said adjustable fastener is a hand tightenable nut and bolt assembly, said bolt of said adjustable fastener configured to be attached to a barbecue lid; and
   a shaped support base hingedly attached to said bottom end of said slide rail, said support base consisting of a rounded tab, a footer, and a hook-and-loop fastening system attached to the bottom of the said shaped support base configured to functionally interact with a barbecue grill to hold the barbecue lid of the grill open.

2. The barbecue lid holder of claim 1 wherein said slide rail is made from a heat-resistant thermoplastic.
3. The barbecue lid holder of claim 1 wherein said slide rail is made from a metal or metal alloy.
4. The barbecue lid holder of claim 1 wherein said support base is made from a heat-resistant thermoplastic.
5. The barbecue lid holder of claim 1 wherein said support base is made from a metal or metal alloy.
6. A barbecue lid holder comprising:
   a slide rail having a top end, a bottom end, and a hollow slot extending from said top end to said bottom end;
   an adjustable fastener slidably attached within said hollow slot of said slide rail, where said adjustable fastener is a hand tightenable nut and bolt assembly, said bolt of said adjustable fastener configured to be attached to a barbecue lid; and
   a shaped support base hingedly attached to said bottom end of said slide rail, said support base consisting of a rounded tab, a footer, and a magnetic fastening system attached to the bottom of the said shaped support base configured to functionally interact with a barbecue grill to hold the barbecue lid of the grill open.
7. The barbecue lid holder of claim 6 wherein said slide rail is made from a heat-resistant thermoplastic.
8. The barbecue lid holder of claim 6 wherein said slide rail is made from a metal or metal alloy.
9. The barbecue lid holder of claim 6 wherein said support base is made from a heat-resistant thermoplastic.
10. The barbecue lid holder of claim 6 wherein said support base is made from a metal or metal alloy.
11. A method of securing a barbecue lid of a barbecue grill in place with a barbecue lid holder, said holder comprising:
    a slide rail having a top end, a bottom end, and a hollow slot extending from said top end to said bottom end;
    an adjustable fastener slidably attached within said hollow slot of said slide rail, where said adjustable fastener is a hand tightenable nut and bolt assembly, said bolt of said adjustable fastener configured to be attached to a barbecue lid; and
    a shaped support base hingedly attached to said bottom end of said slide rail, said support base consisting of a rounded tab, a footer, and a magnetic or a hook-and-loop fastening system attached to the bottom of the said shaped support base, said method comprising the steps of:
    a. securing said fastening system of said support base on said barbecue grill where said support base may remain in place;
    b. adjusting a height and an angle of said lid to a desired position; and
    c. securing said lid in place by securing said adjustable fastener to said slide rail by hand tightening said nut and bolt assembly when the desired position height for the barbecue lid is achieved.

* * * * *